United States Patent [19]

Ogden et al.

[11] 4,168,370

[45] Sep. 18, 1979

[54] PROCESS FOR MANUFACTURE OF AMINO FORMALDEHYDE RESIN

[75] Inventors: Dennis H. Ogden, Wolverhampton; George Inverarity, Kingswinford, both of England

[73] Assignee: British Industrial Plastics Ltd., Manchester, England

[21] Appl. No.: 909,242

[22] Filed: May 24, 1978

[30] Foreign Application Priority Data

May 24, 1977 [GB] United Kingdom ............... 21751/77

[51] Int. Cl.$^2$ ............................................. C08G 12/26
[52] U.S. Cl. .................................. 528/232; 260/95 C; 528/254; 528/259; 528/261
[58] Field of Search ................. 528/259, 232, 254, 261

[56] References Cited

U.S. PATENT DOCUMENTS

| | | | |
|---|---|---|---|
| 1,985,937 | 1/1935 | Luther | 528/261 |
| 1,986,067 | 1/1935 | Paquin | 528/261 |
| 2,729,616 | 1/1956 | Bigelow et al. | 528/259 |
| 2,881,153 | 4/1959 | Herbes et al. | 528/259 |
| 2,881,154 | 4/1959 | Polansky et al. | 528/259 |
| 3,306,861 | 2/1967 | Justice | 260/2.5 |
| 3,714,124 | 1/1973 | Hunsucker | 528/243 |
| 3,830,783 | 8/1974 | Vargiu et al. | 526/66 |
| 3,926,917 | 12/1975 | Jaccard et al. | 528/242 |
| 4,102,943 | 7/1978 | Isaksen et al. | 260/850 |

FOREIGN PATENT DOCUMENTS 1107245  3/1968  Fed. Rep. of Germany.

OTHER PUBLICATIONS

Chem. Abs. 76:114111m, 79(14):80002w, 81(24):153466d, 88(18)122090s.

*Primary Examiner*—Thomas DeBenedictis
*Attorney, Agent, or Firm*—William Anthony Drucker

[57] ABSTRACT

A method for the manufacture of amino-formaldehyde resins of low water content. Amino compound and formaldehyde or paraformaldehyde are reacted at a temperature about 60° C. in the liquid phase, the liquid phase being ensured by a reactive modifier. The reactive modifier is a compound which is capable of taking part in the reaction, and also capable of modifying the mixture of reactants to be liquid at the temperature at which the reaction is to be carried out.

20 Claims, No Drawings

PROCESS FOR MANUFACTURE OF AMINO FORMALDEHYDE RESIN

This invention relates to the manufacture of resins, and in particular the manufacture of aminoformaldehyde resins.

The usual commercial method for the manufacture of aminoformaldehyde resins such as urea-formaldehyde resins is to react the urea and formaldehyde in an aqueous system at a temperature of 60° to 90° C.

The product in such cases will inevitably contain a large amount of water which for many uses has to be removed.

Thus the manufacture of moulding powders from such resins requires a lengthy process in which a large volume of water has to be removed.

We have also found that in the production of foam from urea-formaldehyde resin, as used, for example, for insulation purposes, foams of superior resilience may be produced from resins of low water content as described in our UK Patent Application No. 51269/77.

It has been disclosed (U.S. Pat. No. 1,985,937) that polyhydric alcohols can be reacted with methylol ureas, methyl ethers thereof, or dimethyl thiourea to give a clear viscous solution.

It has been disclosed (U.S. Pat. No. 1,986,067) that urea can be reacted with a glycol and the product condensed with formaldehyde to give a resinous product.

Finally it has been disclosed (UK Patent No. 1,107,245) that a polyetherurea can be obtained by reacting formaldehyde with glycol to produce a hemiformal, and then reacting the hemiformal with urea or thiourea.

However, in each of these three prior art disclosures the end product is a material containing a high proportion of glycol which has totally unsatisfactory properties when considered as replacement for modern urea-formaldehyde or melamine-formaldehyde resins.

It has also been proposed (UK Patent No. 1,390,370) to make amino-formaldehyde resins by reaction, in the absence of solvent, of urea or thiourea, paraformaldehyde, and hexamethylene tetramine in a molar ratio in the range from 1:1.1:0.01 to 1:25:0.2. This proposal however, suffers from the difficulty that in the solid phase, reaction control is virtually impossible and a consistently satisfactory end product is not obtained.

The present invention has, as its primary objective, a process for the preparation of amino-formaldehyde resins of lower water content than by the conventional aqueous system, yet avoiding the difficulties of solid phase reaction.

According to the present invention a method for the manufacture of an aminoformaldehyde resin comprises reacting an amino compound with formaldehyde or paraformaldehyde at a temperature above 60° C. in the liquid phase the liquid phase being ensured by the presence of a minor proportion of a reactive modifier being a compound capable of taking part in said reaction and also capable of modifying the mixture of reactants to be liquid at the temperature at which the reaction is to be carried out.

The reaction is preferably carried out at a temperature in the range 70° C. to 115° C.

By the expression "minor proportion" of reactive modifier we mean that the amount of reactive modifier is less than the amount which would be chemically equivalent to either of the other reactants. Preferably the amount of the reactive modifier is less than this, for example no more than 20 mole percent of the reaction mixture.

In carrying out the method of this invention water may be omitted, or if added, the amount of water present in the reaction mixture (excluding water formed in the condensation reaction) is preferably less than 6% by weight of the total mixture.

The reactive modifier is a compound which will, when the reaction is completed, form part of the resin produced and it is therefore to be used sparingly, and in any event in an amount which does not substantially detract from the properties of the final resin. The function of the reactive modifier in the method of this invention is to render the reactant mixture a liquid at the temperature of reaction so that the reaction can be carried out in a liquid phase.

One way in which this function can be carried out is by forming a mixture of the reactive modifier compound with one of the reactants to depress the melting point of the reactant to a temperature at or below that at which the reaction will satisfactorily take place. The mixture can thus be used as a liquid into which the other reactant can be dissolved at the reaction temperature or slightly below it. One example of this method using urea and paraformaldehyde as the reactants for the resin is to mix the urea with ethylene urea to form a mixture which, when melted, will dissolve paraformaldehyde. Urea alone cannot be used in this way since its melting point is too high (132° C.) and melting is accompanied by decomposition.

An alternative approach is to chemically modify one of the reactants to form a liquid which will dissolve the other. An example of this, using urea and paraformaldehyde as the reactants, is to react the paraformaldehyde with a glycol such as diethylene—or dipropylene glycol under alkaline conditions to form a viscous liquid.

This may then be made acid, and urea, with more paraformaldehyde, dissolved in it to form the reaction mixture.

Another alternative approach is to take glycol and make it alkaline, then dissolve a quantity of urea and paraform in the glycol. This gives a larger bulk of liquid into which further urea and paraform can be dissolved. The mixture may be acidified and partly reacted after the first step but must then be made alkaline again for the further dissolution of urea and paraform. Final reaction is achieved by acidifying the total mixture and warming to 70° C.–115° C. It should be noted that it is not possible to use sufficient glycol to dissolve all of the urea and paraform in one bulk addition and achieve the desired low proportion of glycol in the end product. Hence the glycol is used to modify the initial quantity of reactants to a liquid into which the remainder can be dissolved.

Whilst the alternatives above have been exemplified with reference to urea-formaldehyde resin manufacture it is envisaged that similar techniques can be used to make other amino-formaldehyde resins, such as melamine-formaldehyde, by suitable choice of ingredients.

We have found that by the above technique useful resins can be made using melamine and also benzoguanamine and a mixture of amino compounds such as urea/melamine or urea/benzoguanamine can be used.

When urea is the amino compound it is convenient to speed up the final condensation reaction by acidifying the reaction mixture, but when melamine or benzoguanamine was present, their reactivity was such that acidification was undesirable.

Similarly, when comparing melamine with urea, melamine's solubility is lower and its reactivity is higher. It is therefore desirable to use a higher molar proportion of reactive modifier to melamine than would be required with urea. Thus it will be noted that in the Examples in the specification the molar proportion of reactive modifier to amino compound is lowest when using urea, higher when some triazine is present in the mixture, and highest when melamine is the sole amino compound. In all cases, however, there is less reactive modifier than would be the molar equivalent of the total amino compound, both amino compounds being taken together for this purpose when a mixture of such compounds is used.

Other ingredients may be added to the reaction mixture in the normal manner, a particularly useful ingredient when making a urea-formaldehyde resin to be foamed being low molecular weight, partly reacted melamine-formaldehyde resin which improves the film-forming properties of the resin produced.

The invention will now be particularly described, by way of example only, by means of the following Examples.

EXAMPLE 1

This example illustrates the preparation of a resin from urea, diethylene glycol and paraformaldehyde.

The reagent quantities used are detailed in TABLE I, the urea and paraformaldehyde each being expressed as first and second charges.

TABLE 1

| Reagent Quantity (g) | Reagent | Moles |
|---|---|---|
| 1060 | diethylene glycol | 10 |
| 660 (1st charge) | 91% paraform (aqueous) | = 20 moles Formaldehyde |
| 600 (1st charge) | urea | 10 |
| 473 | BL35* (M/F resin ex BIP) | |
| 1190 (2nd charge) | 91% paraform (aqueous) | = 36 moles Formaldehyde |
| 1200 (2nd charge) | Urea | 20 | pH adjustments:
70 TW Sodium Hydroxide
60% w/w aqueous ammonium sulphamate
*BL 35 is a low molecular weight, partly condensed melamine formaldehyde.

The first charges of diethylene glycol and paraform were mixed and heating and continuous stirring commenced, the pH of the mixture then being adjusted to 9½ with sodium hydroxide. After 20 minutes the paraformaldehyde had dissolved in the glycol, and the temperature had reached 68° C. The pH was adjusted to 5½ by adding 2½ ml of the ammonium sulphamate and heating was discontinued. Addition of the first charge of urea was then carried out gradually over a 15 minute period, this being dissolved in the liquid mixture with evolution of heat, so that the temperature of the mixture rose to 105° C. The temperature was held at this level for 60 mins and the mixture then allowed to cool at 85° C. whereupon the pH was raised to 9½ by addition of sodium hydroxide.

The temperature was held at 85° C. by heating gently, and the BL 35 resin added gradually over 15 mins after which the mixture was allowed to stand for 65 mins, its temperature being held at 86° to 88° C. The second charge of paraformaldehyde was then added over a period of 50 mins, at the same temperature, the pH being held at 8½ to 9 by addition of sodium hydroxide, followed by the second charge of urea (50 mins) at the same temperature with the pH kept above 8 by addition of sodium hydroxide. The reaction mixture was then allowed to stand for 15 minutes for dissolution of solids.

The condensation reaction was commenced by addition of ammonium sulphamate to bring down the pH to 5 and allowed to continue for 40 minutes, at a temperature of 88° C., before being stopped by addition of sodium hydroxide to raise the pH to 9½. The mixture was then cooled and stirring discontinued to yield a liquid resin of low water content whose viscosity at 24½° C. was 700 poise.

The resin so produced was particularly suitable for the manufacture of urea-formaldehyde rigid foam although it could also be for other purposes such as manufacture of moulding powders. It should be noted that the reaction mixture was stirred continuously throughout the procedure outlined above.

The only water added during the manufacture of the resin was that in the 91% paraformaldehyde, the total water addition being 110 g (approximately 3.3% by weight based on total reagents).

EXAMPLES 2, 3 and 4

These examples are comparative, and illustrate the manner in which the invention facilitates the preparation of the resin. Example 2 is an attempted preparation of low water content resin from urea, paraformaldehyde and hexamine. Example 3 is a similar preparation but which water has been added to facilitate control of the reaction. Example 4 is a preparation of a resin by the method of our invention.

The procedures carried out in these examples are expressed in tabular form.

TABLE II

| Reagent | Quantity (gm) | Moles |
|---|---|---|
| Urea | 240 | 4 |
| Paraform (91%) | 198 (including 18gm H$_2$O) | = 6 moles formaldehyde |
| Hexamine | 28 | 0.2 |
| Ammonium Sulphamate | 11.4 | 0.1 |

(Total content of water in the reaction mixture is 5.5% by weight).

TABLE IIA

Experimental Procedure

| Time (mins) | Temp of heating bath for reaction vessel | Note |
|---|---|---|
| 0 | 85–90° C. | The cold premixed urea urea, paraform and hexamine were charged to the reaction vessel |
| 5 | " | Dry mix begining to go damp |
| 17 | " | Mix formed a stiff paste, just stirrable (pH 8–9) |
| 20 | " | Mix stirrable but undissolved solid particles present. Ammonium sulphamate added and stirred in. |
| 26 | " | Reaction went out of control; mix suddenly foamed temperature rose to 105° C. and resin cured. |

The conclusion drawn was that this preparation was of no practical utility.

EXAMPLE 3

TABLE III

| Reagent | Quantity (gm) | Moles |
|---|---|---|
| Urea | 240 | 4 |
| Hexamine | 28 | 0.2 |
| Water | 108 | 6 |
| Paraform (91%) | 198 (including 18 gm H$_2$O) | = 6 moles formaldehyde |
| Ammonium Sulphamate | 11.4 | 0.1 |

(The total content of water in the reaction mixture is 21.5% by weight).

TABLE IIIA

In this example the reaction vessel was heated in a bath maintained at 65°–70° C.

| Time (mins) | Mix Temp (°C.) | Notes |
|---|---|---|
| 0 | 12 | Urea, hexamine and water charged to the reaction vessel heated and stirred (pH 10.–11). |
| 20 | 65 | Clear solution obtained (pH 9½–10) |
| 30–35 | 66–80 | Paraform addition, the mixture exotherms as the paraform dissolves and reacts. The Temperature is kept below 80° C. by removing the hot bath when necessary (pH 7½–9) |
| 40 | 73 | Ammonium sulphamate was added, with an immediate slight exotherm (2°–3° C.) and a drop in pH to 5½–6. |
| 100 | 65–70 | pH of Reaction mixture raised to pH 8–9 by addition of 8N Sodium Hydroxide. Reaction stopped, the product obtained being a viscous opaque white resin which was allowed to cool. |

This preparation was practical but results in a resin with a high content of water.

EXAMPLE 4

TABLE IV

| Reagent | Quantity (gm) | Moles |
|---|---|---|
| Urea | 180 | 3 |
| Hydrated Ethylene Urea | 96 (including 10gm H$_2$O) | 1 |
| Hexamine | 28 | 0.2 |
| Paraform (91%) | 198 (including 18gm H$_2$O) | = 6 moles formaldehyde |
| Ammonium Sulphamate | 11.4 | 0.1 |

(The total content of water in the reaction mixture is 5.5% by weight.

TABLE IVA

In this example the reaction vessel was heated in a vessel maintained at 65°–70° C.

| Time (mins) | Mix Temp (°C.) | Note |
|---|---|---|
| 0 | 15 | The Urea, ethylene urea and hexamine were mixed and charged to the reaction vessel. The mixture was solid and not stirrable |
| 25 | 50 | The mix had liquified sufficiently to be stirrable (pH 10). |
| 30 | 60 | The mixture was liquid, with some undissolved solid, paraform was added and the mix went to a stiff slurry which was just stirrable. The slurry liquified as the paraform dissolved and the mix exothermed. |
| 40 | 67 | The mixture was liquid with some undissolved paraform. |
| 55 | 67 | pH 8½, the mix was a mobile liquid and the Ammonium sulphamate was added dropping the pH to 6–7 causing slight exotherm (2°–3° C.). |
| 115 | 66 | pH 4–5½. the mix was a viscous opaque white resin. The pH was raised to 8–9 by adding 8N Sodium Hydroxide. |

The product, when cooled was a viscous resin of similar viscosity to but very much lower water content than, the product of Example 3.

When comparing the Example 2 with Examples 3 and 4 it will be noticed that the level of heating applied in Example 2 was greater; this was necessary to cause the mix to soften and attain a degree of homogenity, and indicates the problem experienced in Example 2, that of obtaining a homogeneous reaction mixture with a controllable reaction.

EXAMPLE 5

This example illustrates the preparation of a resin from diethylene glycol, urea and paraform.

The amounts of the ingredients used are detailed in Table V and the experimental procedure followed is given in tabular form in Table VA.

TABLE V

| Reagent | Quantity (gm) | Moles |
|---|---|---|
| Diethylene glycol | 424 | 4 |
| Urea (1st addition) | 90 | 1½ |
| Paraform (91%) (1st addition) | 66 (including 6gm H$_2$O) | = 2 moles Formaldehyde |
| Urea (2nd addition) | 690 | 11½ |
| Paraform (91%) (2nd addition) | 528 (including 48gm H$_2$O) | = 16 moles Formaldehyde |

(The total content of water in the reaction mixture is 3% by weight).

TABLE VA

| Time (mins) | Mix Temp (°C.) | pH | Note |
|---|---|---|---|
| 0 | R.T. | | The diethylene glycol, 1st urea and 1st paraform were charged to a reaction vessel and heating commenced. |
| 53 | 145 | 7½ | Solution effervescing, strong smell of formaldehyde (no ammonia evolved). Opaque white solution with undissolved solids (paraform). |
| 55 | 145 | | Begin adding 2nd urea, allow temperature to fall to range 105°/110° C. |
| 90 | 105 | 9 | Odour of ammonia, opaque solution. |
| 130 | 107 | 9½ | Urea addition completed opaque solution. |
| 140 | 111 | 9½ | Allow temperature to |

TABLE VA-continued

| Time (mins) | Mix Temp (°C.) | pH | Note |
|---|---|---|---|
| | | | fall slowly. |
| 205 | 100 | 10 | Opaque solution, strong smell of ammonia, 2nd paraform addition begun keeping temperature at 95°/100° C. and pH above 8 (by addition of 8N NaOH). |
| 215 | 99 | 6 | 3ml NaOH added, immediate exotherm to 103° C. |
| 230 | 99 | 9-9½ | Total NaOH added now 4ml, exotherm maintained temperature. |
| 250 | 98 | 8½ | Total NaOH added now 6ml. |
| 270 | 95 | 9 | Total NaOH added now 8ml. Small heat input necessary during final additions of paraform. |
| 290 | 96 | 9 | Total NaOH added now 11ml, paraform addition complete. |
| 310 | 98 | 9½ | Total NaOH added now 13ml, heating discontinued. |
| 340 | | | Cooling begun. |
| 375 | 32 | 9 | |

The product, when cooled, was a viscous resin with a viscosity at 25° C. of 61 poise, and an SRY solids content of 79.4%.

EXAMPLE 6

This example illustrates the preparation of a resin using diethylene glycol as reactive modifier, with urea, paraform and benzoguanamine. The reagents used and procedure followed are tabulated below, in tables VI and VIA.

TABLE VI

| Reagent | Quantity (gm) | Moles |
|---|---|---|
| Diethylene glycol | 1526.4 | 14.4 |
| Benzoguanamine | 673.2 | 3.6 |
| Paraform (91%) (1st addition) | 237.6 | = 7.2 moles of formaldehyde |
| Urea | 1296.0 | 21.6 |
| Paraform (91%) (2nd addition) | 1425.6 | = 43.2 moles of formaldehyde |

(The total water content of the reaction mixture was 3% by weight).

TABLE VIA

| Time (mins) | Mix Temp (° C.) | pH | Note |
|---|---|---|---|
| 0 | Ambient | | Diethylene glycol, benzognanamine and 1st paraform all charged to reaction vessel. |
| 15 | 25 | 7½ | Solids dispersed, heating on. |
| 75 | 115 | 6½ | Solids dissolved, clear solution, heating off. |
| 80 | 117 | 6½ | Urea addition began, allowing temp. to fall to 110° C. and then holding in range 105/110° C. |
| 170 | 106 | 9 | Urea addition completed. |
| 180 | 110 | 9 | Urea dissolved, heating stopped and temp. allowed to fall to 100° C., then held in range 95/100° C. |
| 250 | 95 | 9½ | 2nd paraform addition begun keeping temp. at 95/100° C. and pH above 8 by addition of 8N NaOH. |
| 270 | 97 | 9 | Slight exotherm maintaining temperature (total of 10ml of NaOH now added). |
| 285 | 96 | 8½ | Some heat input required. |
| 200 | 97 | 8½ | Total of 15ml NaOH now added. |
| 345 | 96 | 9 | Paraform addition complete. Total of 26ml NaOH now added. |
| 385 | 96 | 8½ | Solids fully dissolved. |
| 415 | 100 | 8½ | Heating discontinued. |
| 420 | | | Cooling commenced. |

The final product was a clear viscous resin with a viscosity at 25° C. of 85 poise and a low water content (SRY solids content 82.1%). Upon vacuum concentration this sample was concentrated to a clear resin of viscosity at 25° C. of 552 poise and SRY solids content 91.0%.

EXAMPLE 7

This example illustrates the production of a resin from diethylene glycol (as reactive modifier), melamine and paraform.

The quantities of reagents used are given below in Table VII.

TABLE VII

| Reagent | Quantity (gm) | Moles |
|---|---|---|
| Diethylene glycol | 565.3 | 5.33 |
| Melamine (1st addition) | 168.0 | 1.33 |
| Paraform (91%) (1st addition) | 88.0 | = 2.66 moles formaldehyde |
| Melamine (2nd addition) | 672.0 | 5.33 |
| Paraform (91%) (2nd addition) | 528.0 | = 16 moles formaldehyde |

(The total water content of the reaction mixture was 2.7%).

The diethylene glycol, 1st melamine and 1st paraform additions were charged to a reaction vessel and heated steadily. After 75 mins. the temperature was 135° C. and the solution had cleared (pH9), heating then being discontinued.

The 2nd melamine addition was then commenced, the temperature allowed to fall to 105°/110° C. and held in that range. The 2nd melamine addition took 55 mins. whereupon the pH was 8½ and the temperature was 108° C. Heating was then discontinued.

The 2nd paraform addition was begun, whilst allowing the temperature to fall to 95°/100° C. and holding it in that range, the pH remaining at 8½. The 2nd paraform addition took 40 mins. during which time the pH remained steady.

The temperature was then kept between 90° and 95° C., the pH at 8½ and sample products extracted after 45 mins. 70 mins., 100 mins. and 130 mins. from the time at which paraform addition was completed. The sample resins were cooled down, and their viscosities measured, the results being tabulated below in Table VIIA.

TABLE VIIA

| Sample No. | (Time from completed paraform addition) | SRY solids content | viscosity (25° C.) | Appearance |
|---|---|---|---|---|
| 1 | 45 | 89.30% | 23,600 poise | clear |
| 2 | 70 | 89.83% | 36,960 poise | " |
| 3 | 100 | 90.48% | <80,000 poise | " |
| 4 | 130 | 90.16% | not measurable | " |

EXAMPLE 8

A resin was prepared from diethylene glycol, urea paraform and melamine, following the same procedure as Example 6.

The quantities of reagents used were exactly the same as in Example 6 except that 453.6 gm Melamine replaced the 673.2 gm of Benzoguanamine of the earlier Example.

The final product was an opaque resin of viscosity 116 poise at 25° C. and a solids content of 80.4%.

Upon vacuum concentration a resin of solids content 86.5% and viscosity 3540 poise at 25° C. was obtained.

It should be noted that the solids contents quoted for the resin products in Examples 5 to 8 above were measured by heating weighed samples of the resins for 3 hours at 120° C. to drive off water of reaction, the residue being regarded as the solids content of the resin. These values should therefore not be confused with the frequently quoted value of resin solids in aqueous solution in which the non aqueous content is all taken to be solids, and therefore is generally a very much higher percentage figure.

EXAMPLE 9

This example illustrates the preparation of a resin from melamine, urea and paraform modifier.

The amounts of reagents used in the preparation of the resin are tabulated in Tabe VIII below.

Table VIII

| Reagent | Quantity | Moles |
|---|---|---|
| Diethanolamine | 1680 | 16 |
| Paraform (91%) (1st addition) | 660 | = 20 moles formaldehyde |
| Melamine | 504 | 4 |
| Urea | 1200 | 20 |
| Paraform (91%) (2nd addition) | 990 | = 30 moles formaldehyde |

The procedure followed was that of Example I, the 1st paraform being dissolved in the diethanolamine to form a liquid into which the melamine, urea and 2nd paraform were successively dissolved. The temperature was maintained at 95° to 98° C. throughout after the initial warming up period, and the pH was 9½ throughout.

A resin was produced which was a viscous liquid with a viscosity of 960 poise at 25° C.

We claim:

1. A method for the manufacture of an amino formaldehyde resin which comprises reacting an amino compound with formaldehyde or paraformaldehyde at a temperature above 60° C., in the liquid phase, the liquid phase being ensured by the presence of a minor proportion of a reactive modifier, being a compound capable of taking part in said reaction and also capable of modifying the mixture of reactants to be liquid at the temperature at which the reaction is to be carried out.

2. A method according to claim 1 in which the reaction is carried out at a temperature in the range 70° C. to 115° C.

3. A method according to claim 1 in which the molar proportion of the reactive modifier in the total reactant mixture is no greater than 20 mole %.

4. A method according to claim 1, in which the amount of water present in the total reaction mixture is less than 6% by weight of the total mixture.

5. A method according to claim 1, 2, 3 or 4 in which the reactive modifier is a compound which, when mixed with one of the reactants, will depress the melting point of that reactant to a temperature at or below the temperature at which reaction can satisfactorily be carried out, so that a mixture of the reactive modifier and reactant can be used as a liquid into which the other reactant can be dissolved.

6. A method according to claim 5 in which the reactive modifier is ethylene urea and the reactant with which it is mixed is urea.

7. A method according to claim 5 in which the reactive modifier and reactant when mixed form a liquid of pH above 8 at a temperature of 60° C., the other reactant is dissolved in said liquid at a pH above 8, and the pH of the liquid system is then lowered to below 7 to carry out a condensation reaction, the reaction being terminated by raising the pH to above 8 and cooling the mixture.

8. A method according to claims 1, 2, 3 or 4 in which the reactive modifier is a liquid in which the reactants are soluble, the solution of reactants itself being a solvent for more reactants.

9. A method according to claim 8 in which the reactive modifier is a polyhydric alcohol.

10. A method according to claim 9 in which the reactive modifier is a diethylene glycol.

11. A method according to claim 8, in which an initial quantity of amino compound and paraformaldehyde is dissolved in the reactive modifier under substantially neutral or alkaline conditions, further quantities of first one reactant and then the other are then dissolved in the solution at elevated temperature, and final reaction is carried out at elevated temperature.

12. A method according to claim 11 in which the further quantities of reactant are dissolved at a temperature in the range 90° to 110° C.

13. A method according to claim 11 in which the further quantity of amino compound is dissolved before the further quantity of paraformaldehyde.

14. A method according to claim 8 in which the amino compound is one or more of urea, melamine and benzoguanamine final reaction being carried out under acid conditions when the amino compound is urea alone, and under alkaline conditions when one of the other two compounds is present.

15. A method according to claim 1, 2, 3 or 4 in which the reactive modifier is a compound which is reacted with one of the reactants to form a liquid into which further reactants are dissolved to form the reaction mixture.

16. A method according to claim 15 in which the reactive modifier is a compound which is reacted with paraformaldehyde under alkaline conditions to form said liquid.

17. A method according to claim 16 in which the reactive modifier is a glycol.

18. A method according to claim 17 in which the reactive modifier is diethylene glycol.

19. A method according to claim 16 in which the reactive modifier is diethanolamine.

20. A method according to claim 15 in which the amino compound is one or more of urea, melamine and benzoguanamine, the condensation reaction to make said resin being carried out under acid conditions when the amino compound is urea alone, and under alkaline conditions when one of the other two compounds is present.

* * * * *